3,119,702
PROCESS FOR PREPARING STERILIZED MILK CONCENTRATES

Abraham Leviton, Washington, D.C., and Michael J. Pallansch, Vienna, Va., assignors to the United States of America as represented by the Secretary of Agriculture
No Drawing. Filed July 20, 1962, Ser. No. 211,455
11 Claims. (Cl. 99—212)
(Granted under Title 35, U.S. Code (1952), sec. 266)

A non-exclusive, irrevocable, royalty free license in the invention herein described, throughout the world for all purposes of the United States Government, with the power to grant sublicenses for such purposes, is hereby granted to the Goverment of the United States of America.

This invention relates to a process for preparing concentrated milk products, and particularly relates to a process for preparing concentrated milk products with improved heat stability and storage life.

This application is a continuation-in-part of application bearing Serial No. 192,605, filed May 4, 1962, which, in turn, is a continuation-in-part of Serial No. 57,082, filed September 19, 1960, both of these applications now abandoned.

Sterile concentrated milk products such as evaporated milk are ordinarily prepared by concentrating normal or modified fluid milk to produce a concentrate of the desired content of total solids and the desired ratio between fat and total solids, preferably homogenizing at some point in the preparation of the concentrate, packaging the concentrate in cans or bottles, and sterilizing the packaged concentrate with heat.

There are well-recognized liabilities in the sterile milk products prepared by previously developed processes. It is known that the use of high temperature and short time sterilization results in sufficient destruction of contaminating organisms without the unwanted side-effects of imparting off-color and off-flavors and of heat coagulation which may occur with the long heating period required if lower sterilizing temperatures are used. Both the color and flavor attributes of freshly prepared high temperature-short time (HTST) sterilized concentrated milk compare favorably with the corresponding attributes of market milk. The HTST method would be preferable to the "long-hold" procedure were it not for the tendency of the HTST sterilized milk concentrate to develop a gel-like structure on storage at room temperature.

Gelling manifests itself in a characteristic manner. A period in which viscosity usually increases slightly is followed by one in which the viscosity decreases and then remains fairly steady. Finally, a period is observed in which the viscosity rises, slowly at first, then more rapidly, until the concentrated milk, instead of flowing freely, begins to move as body possessing a liver-like consistency. The soft body gradually gives way to a firm one, inhomogeneities appear and syneresis (exudation of milk serum) may be observed.

An object of the present invention is to produce a packaged sterile concentrated milk product which is stable in storage for long periods of time against gel formation and stratification. Another object of the present invention is to produce a sterile concentrated milk product with improved resistance to heat coagulation. Other objects and a fuller understanding of the invention may be had by referring to the following description and claims.

In general, according to the present invention a sterile concentrated milk product, stable against gel formation, stratification and heat-coagulation, is prepared by incorporating therein about from 0.1 to 1.0%, based on dry weight content of milk solids-not-fat, of a polyphosphate.

Polyphosphates are condensation products of monomeric phosphates. The monomeric phosphates are incapable of prolonging the storage life of concentrated milk products. As a matter of experience their use is actually conducive to gelation. Preferred polyphosphates are those of the commercially available alkali metal systems such as $Na_2O$–$P_2O_5$, in which the ratio of $Na_2O$ to $P_2O_5$ is in the range of 1.0 to 2.0, as exemplified by the pyrophosphate, tripolyphosphate, tetrametaphosphate, hexametaphosphate, and tetraphosphate of commerce.

Sterilized concentrated milk products containing the added polyphosphate have markedly improved storage life compared with products which are exactly the same with the exception that no polyphosphate was added. The improvement in storage life consists essentially in prolonging the time required for gel structure to develop in concentrates containing two to three times as much solids as the milk from which it was derived. Such concentrates, because of the high concentration of solids which they contain, are normally quite unstable in storage. Sterilized concentrated milk products prepared using the HTST method of sterilization, limited by conventional "long-hold" procedures to about 27% whole milk solids or about 19% skim milk solids, may contain an additional 50% milk solids when processed according to the present invention.

The method of sterilizing at about 280° F. (137° C.) with a holding period of about 5 to 15 seconds, usually packaging after rather than before sterilization, is an example of the HTST method. While the use of slightly lower or higher temperatures with slightly longer or shorter holding times respectively also falls into the category of an HTST method, an important consideration in all HTST methods is rapid heating to desired temperature and rapid cooling after sterilizing. Equipment being available, better control is obtained by sterilizing, cooling and then packaging by aseptic procedures instead of packaging and then sterilizing.

In a preferred embodiment of the present invention the adding of the polyphosphate is incorporated into a process for making optimum quality HTST sterilized concentrated milk or milk sterilized in the final package, such a process usually including forewarming the milk, concentrating the forewarmed milk, homogenizing the concentrated milk, and sterilizing and packaging the concentrated milk by an HTST method. The order of the steps of concentrating, homogenizing and sterilizing may be changed where better results can be obtained thereby.

While we prefer to disperse an aqueous solution of the polyphosphate salt in the concentrated milk, the particular means of combining the salt with the milk and the stage of the process at which the combination is performed is considered to be optional as long as good distribution of the polyphosphate throughout the concentrated product is achieved and the packaged product is substantially sterile. The presence of the polyphosphate in the milk does not interfere with any processing technique nor is there any detrimental effect upon sterilizing concentrated milk containing added polyphosphate. On the contrary, added polyphosphates stabilize milk concentrates against coagulation during sterilization. If one should desire to add the polyphosphate after sterilizing the concentrate, the added salt or solution of the salt must be sterile and must be incorporated into the sterilized concentrate by aseptic technique.

The addition of as little as about 0.1% sodium tetraphosphate (1 gm. sodium tetraphosphate per kilogram dry weight of milk solids-not-fat) has a measurable effect on prolonging storage life of the HTST sterilized concentrated milk. A twenty-five percent increase in storage life is obtained with 0.14% of this polyphosphate, and storage life is doubled by adding about 0.3% sodium tetraphosphate, as compared with concentrated milk prepared in exactly the same way with the exception that no sodium tetraphosphate was added. A comparison of effect on storage life when the concentration of added polyphosphate in the product is in the range of about 0.5 to 0.6%, based on dry weight of milk solids-not-fat, shows that most of the polyphosphates are even more effective than sodium tetraphosphate.

Although an advantage accrues to the use of higher concentrations of added polyphosphate, an upper limit of about 0.6% (6 gm. per kilogram dry weight of milk solids-not-fat) for the inorganic polyphosphates and 0.93% for adenosine triphosphate have been selected in order to conform closely to the concentration limits imposed by law on the use of stabilizing salts in evaporated milk. Furthermore, the use of concentrations greater than about 10 to 15 gm. polyphosphate per kilogram of milk solids-not-fat conduces to the development of excessive body in the milk product.

In demonstrating the present invention a storage temperature of 30° C. was selected, and viscosity measurements were made at this temperature. The improvement in stability of the products is considered as applicable to all storage conditions.

The storage life of a sample is taken as the time required for the "stirred-out" viscosity to reach a value which is twice the minimum viscosity observed during storage. The "stirred-out" viscosity is defined as the viscosity of a sample after the position of the sample in a capillary tube has been reversed twice by the application of centrifugal force.

Viscosity measurements were made in bomb microviscometers fabricated from thin-walled capillary tubing and containing a small glass bead within the tubing. Viscosity ("stirred-out") measurements, were determined at 30° C. with the viscometers inclined at an angle of approximately 10° to the vertical by measuring the time of transit of the glass bead between two marks on the microviscometer. Viscosity values were calculated and recorded as centipoises.

The practice of this invention is illustrated by the following examples.

EXAMPLE 1

Skim milk containing 9.17% solids was forewarmed at about 100° C. for 17 minutes. The forewarmed milk was concentrated in vacuo to contain 31.1% solids. To aliquots of this concentrate were added sufficient quantities of a water solution of sodium tetraphosphate and/or distilled water to give four concentrates containing 28% milk solids and, respectively, 0, 1.4, 2.8, and 5.6 grams sodium tetraphosphate per kilograms milk solids. Each of the aliquots was intimately mixed to distribute the sodium tetraphosphate uniformly throughout the aliquots which contained the added salt and to provide uniform distribution of milk solids in all aliquots.

For each aliquot a sample was introduced into a bomb microviscometer and a viscosity determination of the unsterilized concentrate made by the procedure previously described. Groups of similar microviscometers were loaded, sealed, sterilized at 280° F. (137.4° C.) for 5 seconds, cooled to room temperature, representative tubes of each aliquot retained for viscosity determinations, and the remainder of the tubes stored at 30° C. During storage the samples were turned occasionally to retard sedimentation. Viscosity measurements were made periodically. The results are tabulated in Table 1.

Table 1

STORAGE LIFE OF SKIM MILK CONCENTRATES (28% MILK SOLIDS) WITH AND WITHOUT SODIUM TETRAPHOSPHATE

| Concentration of Sodium Tetraphosphate, g. per kg. Solids-not-fat | Viscosity [1] Before Sterilization, centipoises | Viscosity [1] After Sterilization,[2] centipoises | Minimum Viscosity [1] During Storage, centipoises | Storage Life,[3] days |
|---|---|---|---|---|
| 0 | 7.0 | 12.0 | 8.4 | 16 |
| 1.4 | 7.5 | 13.4 | 8.2 | 20 |
| 2.8 | 8.0 | 11.4 | 6.7 | 32 |
| 5.6 | 8.5 | 11.4 | 6.3 | 60 |

[1] Viscosity measured at 30° C.
[2] Sterilized by heating at 280° F. for 5 seconds.
[3] Samples stored at 30° C.

The data in Table 1 show that the storage life of the packaged sterilized concentrated milk is increased by the addition of sodium tetraphosphate, and that the increase in storage life is furthered by each additional increment of sodium tetraphosphate. According to the criterion of storage life used in these tests, the storage life of the concentrate containing no added salt comes to an end after 16 days of storage; that of the concentrate containing 1.4 grams sodium tetraphosphate per kilograms of milk solids-not-fat (0.14% dry weight basis) comes to an end after 20 days of storage; the addition of 2.8 grams sodium tetraphosphate per kilogram of milk solids-not-fat prolongs the storage life to 32 days; and the end of the storage life of concentrates containing 5.4 grams sodium tetraphosphate per kilogram milk solids-not-fat had not been reached after 60 days storage.

EXAMPLE 2

Skim milk was forewarmed at about 100° C. for 17 minutes. The forewarmed milk was concentrated in vacuo to contain 31.1% solids. To each of six aliquots of this concentrate was added one of the following: water, sodium pyrophosphate solution, sodium tripolyphosphate solution, solution of the sodium salt of adenosine triphosphate, sodium hexametaphosphate solution and sodium tetrametaphosphate solution to give six concentrates containing 28% milk solids and, respectively, 0, 0.61, 0.56, 0.93, 0.50, and 0.55 gram of the aforementioned polyphosphates per kilograms to distribute the added salt uniformly, and to provide uniform distribution of milk solids in all aliquots.

Viscosity measurements were made exactly as described in Example 1. The results are tabulated in Table 2.

Table 2

INFLUENCE OF SOME COMMERCIALLY AVAILABLE POLYPHOSPHATES ON STORAGE LIFE OF A HTST STERILIZED SKIM MILK CONCENTRATE (28.2% MILK SOLIDS)[1].

[Sterilization temperature and time, 137.4° C. and 5 seconds]

| Additive | Additive Concentration,[2] g. per 100 g. milk solids | Viscosity Before Sterilization, centipoises | Viscosity After Sterilization, centipoises | Minimum Viscosity, centipoises | Time to Reach Min. Viscosity, days | Storage Life at 30° C., days |
|---|---|---|---|---|---|---|
| None | | 9.0 | 12.8 | 11.0 | 4–6 | 11 |
| Pyrophosphate | 0.61 | 13.2 | 12.6 | 8.9 | 4–6 | 33 |
| Tripolyphosphate | 0.56 | 11.8 | 12.9 | 8.3 | 4–6 | 59 |
| Adenosine triphosphate | 0.93 | 9.9 | 14.5 | 11.1 | 4–6 | 80 |
| Hexametaphosphate (n-7.0) | 0.50 | 10.2 | 12.8 | 7.5 | 4–6 | 148 |
| Tetrametaphosphate | 0.55 | 9.0 | 11.6 | 7.9 | 5–8 | 159 |

[1] Skim milk used in this experiment had been stored at 4° for one week.
[2] Concentration refers to weight of additives in anhydrous state. Additives contain same number of available orthophosphate groups.

The data in Table 2 show that the storage life of the packaged sterilized concentrated milk is increased by the addition of polyphosphates, and that the efficiency per phosphorous atom increases with increasing chain length of the linear polymer. According to the criterion of storage life used in these tests, the storage life of the concentrate containing no added salt comes to an end after 11 days of storage; those of the concentrates containing pyrophosphate, tripolyphosphate, adenosine triphosphate, hexametaphosphate and tetrametaphosphate come to an end respectively after 33, 59, 80, 148 and 159 days of storage. Adenosine triphosphate is more efficient than the corresponding inorganic tripolyphosphate, and the cyclic tetrametaphosphate is more efficient than any of the linear polyphosphates.

Nomenclature as applied commercially to inorganic linear polyphosphate glassy mixtures differs from that to which research workers generally adhere. For example, amongst research men, sodium hexametaphosphate is taken to mean a polyphosphate glass of very long chain length for which the ratio $Na_2O/P_2O_5$ is very nearly equal to 1, whereas for the hexametaphosphate of commerce, the ratio may be somewhat greater than 1, and varies. Thus the ratio, $Na_2O/P_2O_5$, for the hexametaphosphate of Example 2 was found to be equal to 1.28 which corresponds to a mixture of chains containing an average of seven phosphorous per chain. The tetraphosphate in research is taken to mean a polyphosphate with four phosphorous atoms per chain, and a $Na_2O/P_2O_5$ ratio of 1.5. The commercial tetraphosphate glass, however, Example 1 contained an average of 4.8 phosphorous atoms per chain corresponding to a $Na_2O/P_2O_5$ ratio of 1.7. The tripolyphosphate of commerce is an individual entity rather than a mixture containing three phosphorous atoms per chain as the name implies. Adenosine triphosphate is an organic crystalline polyphosphate, an individual entity with three phosphorous atoms per chain. Sodium tetrametaphosphate is a cyclic condensed phosphate, a single entity, with four phosphorous atoms joined by oxygen atoms to form a ring structure. Sodium pyrophosphate is a well known crystalline compound, a single entity containing two phosphorous atoms per chain.

The inventive process, illustrated in the examples with improvement of storage life of sterilized concentrated skim milk, is equally applicable to HTST sterilized concentrated whole milk products, including conventional concentrations and those with various proportions of fat content.

EXAMPLE 3

In this example, a pilot plant assembly was used to prepare HTST sterilized milk concentrates. Three concentrates each containing 36% solids were prepared. One contained no additive, another contained 0.4 lb. per 100 lb. milk solids of a mixture of mono-, and disodium monophosphates, and the third contained 0.4 lb. per 100 lb. milk solids of a polyphosphate glass (sodium tetraphosphate) with an average of 4.8 phosphorous atoms per chain. The following processing schedule was employed: standardization to the ratio between fat and total solids of 1:3.25; forewarming at 280° F. for 15 seconds in a Mallory heat exchanger; concentration in a batch vacuum pan; addition of additive and standardization; sterilization at 280° F. for 15 seconds; cooling to 160° F.; homogenizing in two stages—at 7500 and 500 p.s.i., respectively; cooling to room temperature; filling baby size 6 ounce cans aseptically and sealing; and storing at 70° F. Viscosity changes were followed with a transpiration type viscometer. The storage life of the control concentrate was 45 days, that of the concentrate containing the monophosphate (orthophosphate), 16 days, whereas that of the concentrate containing polyphosphate was more than 441 days, and its viscosity at the end of this time was 25.8 centipoises.

EXAMPLE 4

In the preceding example, the sterilization step followed the concentration step. In this example, the sterilization precedes concentration. The sequence of processing steps was as follows: Standardization to a ratio between fat and total solids of 1:3.25; forewarming at 280° F. for 15 seconds; addition per 100 lb. milk solids of either 0.4 lb. polyphosphate or monophosphate buffer salts as in Example 3; sterilization at 280° F. for 15 seconds; concentration aseptically to approximately 36% solids; filling cans and sealing aseptically; and storing at 70° F. The storage life of the control concentrate was 7 days, that of the monophosphate (orthophosphate) containing product 3 days, whereas that of the polyphosphate containing concentrate was 240 days.

We claim:

1. A process for preparing a sterile concentrated milk product comprising forewarming the milk, concentrating the forewarmed milk, homogenizing the concentrated milk, and sterilizing and packaging the homogenized, concentrated milk by a high temperature-short time method, and, at any stage of the process prior to sterilizing, dispersing in the milk about from 0.1 to 1.0%, based on dry weight content of milk solids-not-fat, of a polyphosphate.

2. The process of claim 1 in which the polyphosphate dispersed in the milk is about from 0.1 to 0.6%, based on the dry weight content of milk solids-not-fat, of sodium tetrametaphosphate.

3. The process of claim 1 in which the polyphosphate dispersed in the milk is about from 0.1 to 0.6%, based on the dry weight of milk solids-not-fat, of sodium hexametaphosphate.

4. The process of claim 1 in which the polyphosphate dispersed in the milk is about from 0.1 to 0.6%, based on the dry weight content of milk solids-not-fat, of sodium tetraphosphate.

5. The process of claim 1 in which the polyphosphate dispersed in the milk is about from 0.1 to 1.0%, based on the dry weight content of milk solids-not-fat, of adenosine triphosphate.

6. The process of claim 1 in which the polyphosphate dispersed in the milk is about from 0.1 to 0.6%, based on the dry weight content of milk solids-not-fat, of sodium tripolyphosphate.

7. A process comprising dispersing in milk about from 0.1 to 1.0%, based on the dry weight content of milk solids-not-fat, of a polyphosphate to give a milk product, forewarming the milk product, concentrating the forewarmed milk product, homogenizing the concentrated milk product, and sterilizing and packaging the homogenized concentrated milk product by a high temperature-short time method to give a packaged sterilized concentrated milk product of improved storage stability.

8. A process comprising forewarming a milk, dispersing in the forewarmed milk about from 0.1 to 1.0%, based on dry weight of milk solids-not-fat, of a polyphosphate to give a forewarmed milk product, concentrating the forewarmed milk product, homogenizing the concentrated milk product, and sterilizing and packaging the homogenized concentrated milk product by a high temperature-short time method to give a packaged sterilized concentrated milk product of improved storage stability.

9. A process comprising forewarming a milk, concentrating the forewarmed milk, dispersing in the concentrated milk about from 0.1 to 1.0%, based on dry weight of milk solids-not-fat, of a polyphosphate to give a concentrated milk product, homogenizing the concentrated milk product, and sterilizing and packaging the homogenized concentrated milk product by a high temperature-short time method to give a packaged sterilized concentrated milk product of improved storage stability.

10. A process comprising forewarming a milk, concentrating the forewarmed milk, homogenizing the concentrated milk, dispersing in the homogenized concentrated milk about from 0.1 to 1.0%, based on dry weight of milk solids-not-fat, of a polyphosphate to give a homogenized concentrated milk product, and sterilizing and packaging the homogenized concentrated milk product by a high temperature-short time method to give a packaged sterilized concentrated milk product of improved storage stability.

11. A process comprising forewarming a milk, concentrating the forewarmed milk, homogenizing the concentrated milk, sterilizing the concentrated milk product by a high temperature-short time method, dispersing in the sterile milk concentrate about from 0.1 to 1.0%, based on the dry weight of milk solids-not-fat, of a sterile polyphosphate and packaging the sterile, polyphosphate-containing, concentrated milk to give a packaged sterilized concentrated milk product of improved storage stability.

References Cited in the file of this patent

UNITED STATES PATENTS

| | | |
|---|---|---|
| 2,064,110 | Hall | Dec. 15, 1936 |
| 2,135,054 | Schwartz | Nov. 1, 1938 |
| 2,553,783 | Park | May 22, 1951 |

OTHER REFERENCES

Hunziker: "Condensed Milk and Milk Powder," 7th ed., pub. by Author, La Grange, Ill., 1949.